125,552

UNITED STATES PATENT OFFICE.

GEORGE L. EAGAN, OF SAN FRANCISCO, CALIFORNIA, ASSIGNOR TO HIMSELF AND W. H. VAN DOREN, OF SPRINGFIELD, ILLINOIS.

IMPROVEMENT IN ARTIFICIAL STONES.

Specification forming part of Letters Patent No. 125,552, dated April 9, 1872.

*To all whom it may concern:*

Be it known that I, GEORGE L. EAGAN, of San Francisco, in the county of San Francisco and State of California, have invented a certain new and useful Improvement in Artificial Stone; and I do hereby declare the following to be a full, clear, and exact description of the same.

The object of this invention is to produce for public use an improved artificial stone; and to this end the invention consists in the process of manufacturing the stone as hereinafter described, and in the stone produced by such process, as a new article of manufacture.

My improved process is as follows, consisting, essentially, of three steps: First in the order of manufacture, I prepare a liquid by boiling together three gallons of water; one pound of sal-soda, or its equivalent; one pound colophony, resin, asphaltum, or other bituminous matter; and one ounce of litharge. These substances are to be boiled together about three hours, or until all are dissolved into one homogeneous mixture. A solution of silicate of soda or potash may be employed in lieu of water and sal-soda. Secondly, I thoroughly mix one part cement or water-lime with three parts sand, and moisten the same with the liquid above described. When the mass has been well beaten together it is molded in suitable molds and the result left to set until sufficiently dry for the next step in the process. Thirdly, I take the stones thus molded and by any suitable means I force through the material a solution of silicate of soda or potash, care being taken to drive the silicate into the pores to every part of the stone. When sufficiently saturated the material is again allowed to dry, and is then ready for use. To color the blocks any pigment may be mixed with the solution of silicate and forced into the material therewith.

The process thus consists, first, in a base of lime or cement and sand; secondly, in moistening the base with the liquid above described to prepare it for molding; and, thirdly, after molding or forming into blocks, the forcing of the silicate into or through the blocks by pressure or other means which will drive it to every part thereof.

So far as the first two steps of the process are concerned, I am aware that both lime or cement and sand have been for ages used in making artificial stone, cement, and plaster; I do not, therefore, claim the exclusive right to use these elements in making such articles.

I am also aware that in some artificial stones heretofore manufactured sal-soda has been used; in others, asphaltum; in others, litharge; and in others, silicate of soda or potash. I do not, therefore, claim the exclusive right to use either of said substances in the manufacture of artificial stone, concrete, or cement; but the use of the lime or cement and sand in connection with the moistening liquid, as described, produces a very superior article upon which to perform the last operation of my process; an article, in other words, which would constitute an inferior stone without the last part of the process, but which is especially adapted to such last step, and with it becomes at once a superior stone. So far as it is claimed herein, therefore, it is claimed as a base or ground work for the last part of the process, and not as a finished stone.

The last step of the process—the forcing of the silicate through the entire mass—perfects and finishes the stone. This part of the process can be performed upon any stone, earthen material, or brick; but, from the experiments which I have made, none of them are believed to answer the purpose so well as the substance specially prepared by me as above described. The silicate permeates the entire mass, solidifying and indurating it so that it becomes impervious to moisture, incapable of being easily worn away by the elements or other causes, and able to sustain great pressure and weight. While I prefer, therefore, to force my silicate into the prepared stone, as described, I do not limit the forcing process to such prepared material, but claim to use it upon any material suitable therefor.

Disclaiming, therefore, the desire to monopolize any one of the ingredients referred to in making artificial stone, and disclaiming the mixing of the silicates with the mass while it is in a plastic state, on the one hand, as well as the application of the silicate to the surface of the hardened stone by a brush, or by subjecting the stone to a bath not under pressure—

I claim as my invention the following, viz.:

The described process for manufacturing artificial stone, consisting of the following steps—viz., first, the preparation of a material composed of lime or cement and sand, moistened with a previously-prepared bituminous or asphaltic solution; secondly, the molding of the material thus prepared and moistened; thirdly, the drying of the same; and, fourthly, the complete saturation of the stone thus prepared with silicates after it has been thus molded and dried, substantially as and for the purposes set forth.

GEORGE L. EAGAN.

Witnesses:
L. B. ADAMS,
WM. PRESCOTT.